United States Patent

Ariga

[11] Patent Number: 5,820,269
[45] Date of Patent: Oct. 13, 1998

[54] ROLLER-TYPE LINEAR GUIDE APPARATUS

[75] Inventor: Masahiro Ariga, Kawaguchi, Japan

[73] Assignee: Pulton Chain Co., Inc., Japan

[21] Appl. No.: 543,652

[22] Filed: Oct. 16, 1995

[30] Foreign Application Priority Data

Oct. 17, 1994 [JP] Japan .................................. 6-275557

[51] Int. Cl.$^6$ .................................................. F16C 29/04
[52] U.S. Cl. ............................. 384/53; 384/54; 384/58
[58] Field of Search .................. 384/53, 58, 54, 384/13, 55

[56] References Cited

U.S. PATENT DOCUMENTS 4,390,216  6/1983  Mueller et al. ........................ 384/53
4,648,725  3/1987  Takahashi ............................. 384/58

FOREIGN PATENT DOCUMENTS 228730  10/1983  Japan .
6453620  4/1989  Japan .

*Primary Examiner*—Lenard A. Footland
*Attorney, Agent, or Firm*—Ostrolenk, Faber, Gerb & Soffen, LLP

[57] ABSTRACT

A parallel guide apparatus comprises two roller-type linear guide apparatuses disposed in spaced-apart, confronting, parallel relation. Each roller-type linear guide apparatus comprises a rail 2 and a slider 3 slidably assembled into the rail 2 via a roller 9. The rail 2 is made by deforming a plate material to form a channel-shaped cross section. The slider 3 has at least three roller 9 which are disposed such that their entire width d becomes slightly larger than the distance 2 between opposite guide planes of the rail 2. The rollers 9 supported on the slider 3 are brought into contact with guide planes of the rail 2. The rollers 9 may be made of a sintered metal impregnated with a lubricant. The rollers 9 in one of the roller-type linear guide apparatus are slightly movable toward the rollers 9 in the other roller-type linear guide apparatus.

1 Claim, 3 Drawing Sheets

ROLLER-TYPE LINEAR GUIDE APPARATUS

BACKGROUND OF THE INVENTION

1. Field of the Invention

This invention relates to a roller-type linear guide apparatus used to guide, in particular, a light weight structure along a linear travel path.

2. Description of the Related Art

There have been proposed various kinds of roller-type linear guide apparatuses in which a slider is guided along a straight rail through a roller such that a structure fixed to the slider is conveyed along a predetermined travel path (Japanese Utility Model Laid-Open 64-53620 (1989), Japanese Patent Post-Examination Publication 2-28730 (1990), etc.). The term "structure" herein means any solid structure to be moved substantially straight along a rail. All these apparatuses are directed to improvement of the linearity accuracy, simplification of the construction and a decrease of the manufacturing cost. Improvement of the linearity accuracy requires the use and precise machining of a high-grade material to diminish errors in linearity of the rail and in fitness of the roller in the apparatus so as to minimize pitching and yawing of the plate. Improvement in this respect is therefore difficult for low-cost products.

Therefore, in case of roller-type linear guide apparatuses fabricated without precision machining, errors occur even among individual products in the same production lot, and the rate of errors is usually different for individual products. Such errors are especially large in rails which are made by plastic deformation of a plate material to simplify the construction, and dimensional errors often occur even within a single rail.

In order to compensate an insufficient linearity accuracy caused by errors in the rail and the slider, the roller-type linear guide disclosed in Japanese Utility Model Laid-Open 64-53620 (1989) uses an eccentric axis attached to the roller to adjust the gap between the rail and the roller by rotation and adjustment of the eccentric axis.

This approach, however, cannot readily determine the standard position for adjusting the gap between the rail and the roller, and therefore makes such adjustment difficult and time-consuming, which in turn causes a considerable increase in man-hour in the manufacturing process. In addition, the need for machining the eccentric axis also increases the man-hour.

Such roller-type linear guide apparatuses are sometimes combined to make a parallel guide apparatus in which two rails are disposed in a parallel, face-to-face, isolated relation, with the sliders located inside, to sandwich a structure between the sliders. In such cases, if no allowance (looseness) is provided between two roller-type linear guide apparatuses to permit the sliders to travel, then these two apparatuses must be assembled with a high accuracy, and much time is required for the assembly. In contrast, if an allowance is provided between both roller-type linear guide apparatuses to permit the sliders to travel, then their guiding function becomes unstable.

OBJECTS OF THE INVENTION

It is therefore an object of the invention to provide a roller-type linear guide apparatus having a simple construction, inexpensive, easy to assemble, and having a high linearity accuracy.

Another object of the invention is to provide a parallel guide apparatus using such roller-type linear guide apparatuses and easy to assemble, in which the rails are disposed in a parallel, face-to-face, isolated relation, with the sliders located inside.

SUMMARY OF THE INVENTION

According to a first aspect of the invention, there is provided a roller-type linear guide apparatus comprising a rail and a slider, the rail being made by deforming a plate material to exhibit a channel-shaped cross section and having opposite side walls whose inner surfaces define guide planes, and the slider having a plate for mounting a structure, and at least three rollers.

The slider is slidably assembled in the rail such that the rollers on a plate are brought into close contact with and supported by guide planes of the rail.

Each roller of the slider has an outer diameter smaller than the distance between right and left guide planes of the rail, and is mounted via a bearing around an axis extending normally to the surface of the plate and projecting on one surface of the plate.

The plurality of rollers attached to the plate are disposed at offset positions in both the lengthwise and transversal directions of the rail such that their total width in the transversal direction of the rail is slightly larger than the distance between guide planes of the rail and alternately contact the guide planes of the rail.

Preferably, the rollers are made of sintered metal and impregnated with a lubricant, or alternatively, made of an elastic material such as plastic resin or rubber, and the rollers are mounted for movement relative to the axis by a slight amount in the axial direction.

According to another aspect of the invention, there is provided a parallel guide apparatus including two roller-type linear guide apparatuses disposed in parallel. In one of the two roller-type linear guide apparatuses, bearings of the rollers are movable relative to the plate in the axial direction of the axes. These two roller-type guide apparatuses are disposed in parallel such that their plates are oriented face to face each other.

In the roller type linear guide apparatus, the rail made by deforming a plate material to exhibit a channel-shaped cross section simplifies the construction of the roller-type linear guide apparatus. The construction in which the entire width of the plurality of rollers attached to the plate is slightly larger than the distance between guide planes of the rail, and prevents looseness between the rail and the slider.

The construction in which the plurality of rollers are located at offset positions in both the lengthwise and transversal directions of the rail to alternately contact with right and left guide planes of the rail in the lengthwise direction, pitching and yawing of the slider are prevented.

In the parallel guide apparatus in which parallel-disposed two roller-type linear guide apparatus supports a structure between them, one of the roller-type linear guide apparatuses, having rollers prohibited to move in the axial direction of the axes, guide the structure along a straight path, while the other roller-type linear guide apparatus, having rollers permitted to move in the axial direction of the axis, facilitates the assembling of the apparatus.

DESCRIPTION OF THE PREFERRED EMBODIMENTS

Figure 1:
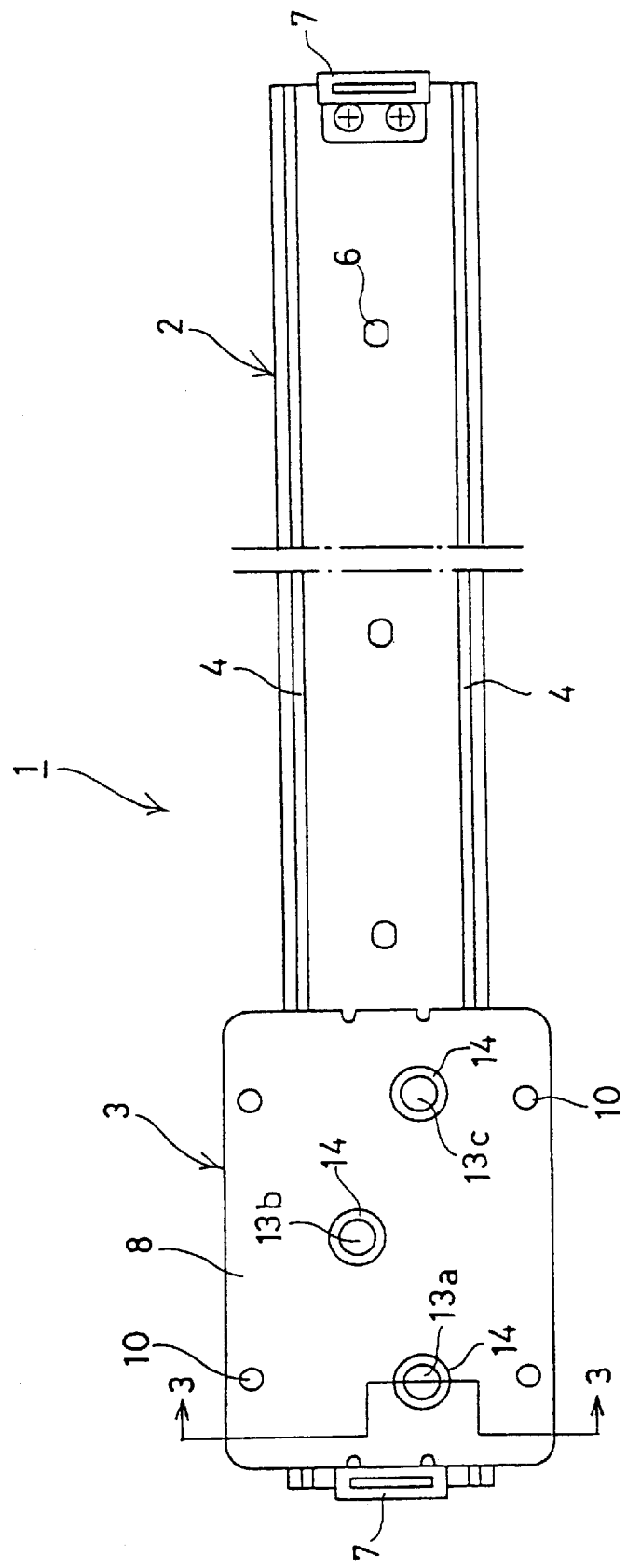
FIG. 1 is a plan view showing the entirety of a roller-type linear guide apparatus according to the invention.
Figure 2:
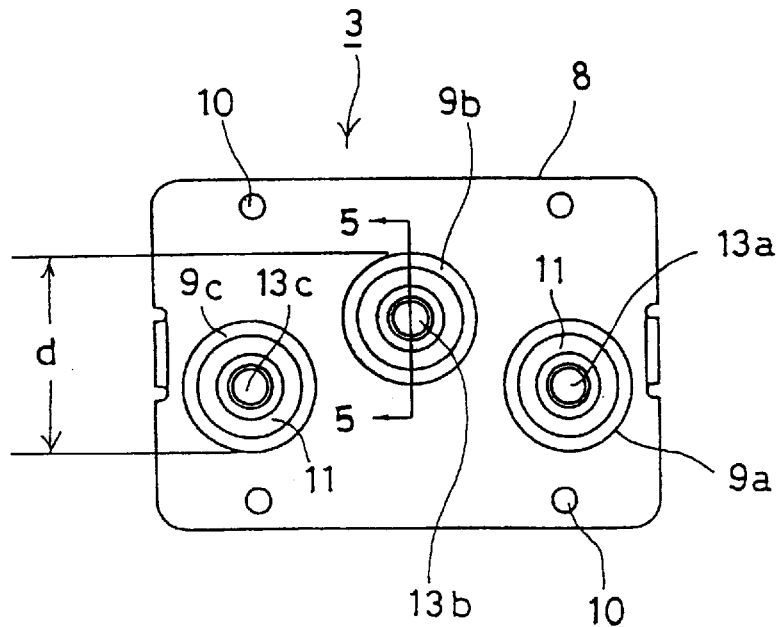
FIG. 2 is a plan view of a slider, viewed from its back.

FIG. 1 shows a roller-type linear guide apparatus 1 according to the invention, which comprises a rail 2 and a slider 3.

The rail 2 is made by deforming a plate material, such as a steel plate, to exhibit a channel-shaped cross section (FIG. 3), and inner surfaces of both lateral walls 4a and 4b define guide planes. The bottom plate 5 of the rail 2 has mounting holes 6 spaced apart from each other in the lengthwise direction. The rail 2 has rubber cushions 7 at both ends thereof to behave as stoppers for the slider 3. Marginal edges of the lateral walls 4a and 4b of the rail 2 are curled inwardly to prevent the slider 3 assembled to the rail 2 from slipping out of the rail 2 upwardly in FIG. 3.

The slider 3 comprises a plate 8 to which a structure is to be fixed, and a plurality of rollers, i.e. three rollers 9(a, b, c) in this embodiment. The plate is a light, highly-rigid, flat board to which a structure to be guided by the roller-type linear guide apparatus 1 is fixed. Reference numeral 20 denotes a fixture hole used to fix the structure to the plate 8.

Each roller 9(a, b, c) contains a bearing 11 which is prevented from slipping out by a stopper ring 12. Each roller 9(a, b, c) is mounted to an axis 13(a, b, c) by caulking the tip end of the axis 13 after the inner ring of the bearing 11 comes to fit with a step portion formed in a middle portion of the axis 13(a, b, c). The axis 13 is fixed to the plate 8 by caulking the base end of the axis 13 after the base end fit with a fitting land 14 made in the plate 8 by embossing. As a result, each roller 9(a, b, c) is held rotatable via the bearing 11 with respect to the axis 13(a, b, c) normal to the plane of the plate 8 and fixed to the plate 8 with its base end projecting on one surface of the plate 8.

Figure 3:
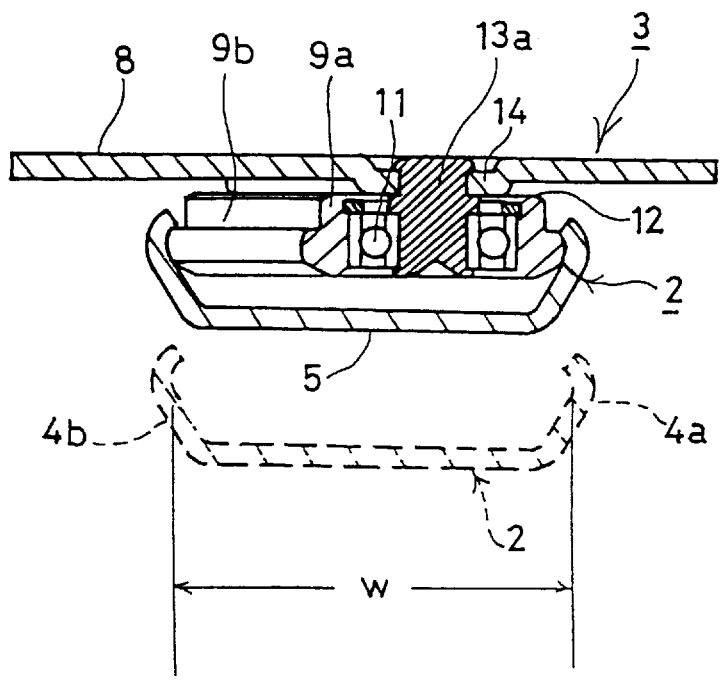
FIG. 3 is a cross-sectional view of the roller-type linear guide apparatus in an enlarged scale, taken along the A—A line of FIG. 1.

Each roller 9 used in this embodiment is made of an oil-impregnated sintered metal, and all have the same outer diameter in this embodiment, which is smaller than the distance w between right and left guide planes of the rail 2 (FIG. 3).

The rollers 9(a, c) among the three rollers 9(a, b, c) attached to the plate 8 are aligned in the lengthwise direction of the rail 2 along a line nearer to one side edge of the rail 2, and the roller 9b is located at a position between the rollers 9(a, c) and nearer to the other side edge of the rail 2. Therefore, the rollers 9(a, b, c) are disposed to alternately contact the right and left guide planes of the rail 2 in both the lengthwise and transversal direction of the rail 2. The entire extension of the rollers 9(a, b, c) in the width direction, that is, the entire width d of the rollers 9(a, b, c) in offset positions in the transversal direction of the rail 2 is slightly larger than the distance w between both guide planes of the rail 2.

The slider 3 is slidably assembled into the rail 2 such that the rollers 9(a, b, c) on the plate 8 are contacted and supported by the guide surfaces of the rail 2. Although the entire width d of the rollers 9 in transversely offset positions on the plate 8 is larger than and different from the distance w between the guide planes of the rail 2, the rail 2 fittingly receives the slider 3 because the rail 2 made of a plate material is resiliently deformable outwardly and absorbs the dimensional difference. Positional adjustment of the rollers 9 is not necessary.

In the above-described construction, the rail 2 made of deforming a plate material has a simple shape and is inexpensive. In addition, since no looseness exits between the slider 3 and the rail 2 during movements of the slider 3, the linearity accuracy is high. Although the rollers 9 contact with the guide surfaces of the rail 2 at points or along lines and cause a high plane pressure, which results in increasing the contact pressure, if the rollers 9 are made of an oil-impregnated sintered metal, sufficient lubrication protects the elements from unordinary abrasion. In addition, if the rollers 9 are made of an elastic material such as plastic resin or rubber, the dimensional difference is absorbed by elastic deformation of the rollers 9 themselves, which protects the elements from unordinary abrasion and improves the linearity accuracy.

Figure 4:
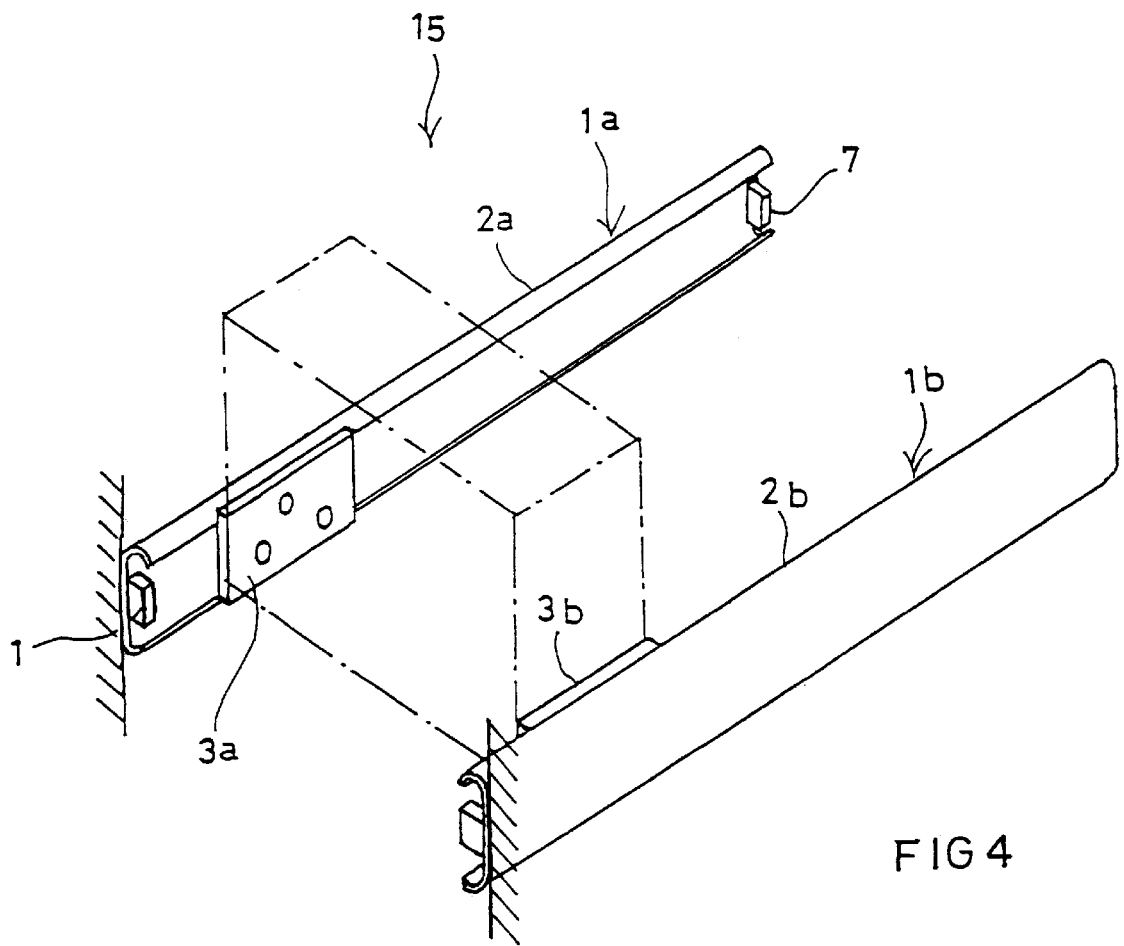
FIG. 4 is a simplified perspective view of a parallel guide apparatus according to the invention.

FIG. 4 shows a parallel guide apparatus 15 in which two roller-type linear guide apparatuses 1(a, b) are mounted in parallel such that their sliders 3(a, b) are disposed face to face.

Figure 5:
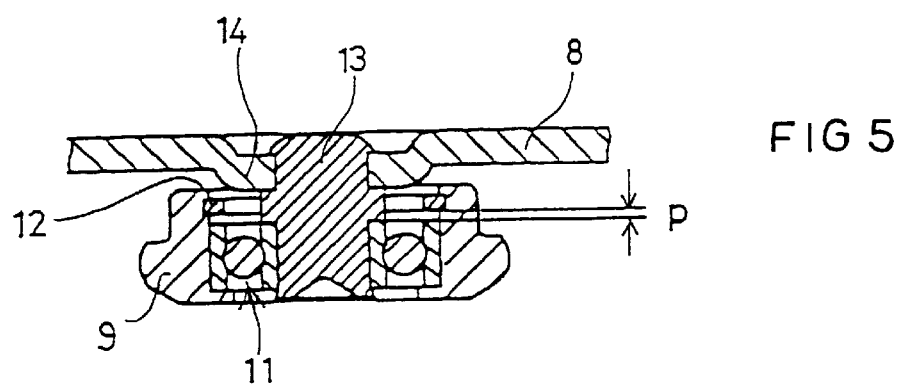
FIG. 5 is a cross-sectional view of the roller-type linear guide apparatus, taken along the B—B line of FIG. 1, in which a roller different from that of FIG. 3 is used as a second embodiment.

These two roller-type linear guide apparatuses 1(a, b) have similar constructions. One of the roller type linear guide apparatuses, 1a, has the above-mentioned construction which is excellent in linearity with no looseness. The other roller-type linear guide apparatus 1b also has the same construction as the above-described roller-type linear guide apparatus 1 except that, as shown in FIG. 5, each roller 9 (a, b, c) and each associated bearing are assembled with a slight distance from the plate 8 so that it can move by a slight amount p (p=0.5 mm to 1.0 mm, approximately) relative to the plate 8 in the axial direction of the axis 13(a, b, c).

The parallel guide apparatus 15 is used by installing a structure (shown by a dot-and-dash line) to sandwich it between the sliders 3(a, b) disposed face to face (FIG. 4). If there is a large error in the parallel relation of the rails 2(a, b) of the two roller-type linear guide apparatuses 1(a, b) (when viewed in a plan view), locking, catching or other like troubles may occur during movement of the sliders 3(a, b). In this invention, however, since rollers 9(a, b, c) of the roller-type linear guide apparatus 1b are individually movable relative to the bearings 11 in the axial direction, they ensure smooth movements of the sliders 3(a, b) and the structure supported between the sliders by absorbing the error in the parallelism causing the trouble. In contrast, the roller-type linear guide apparatus 1a guides the structure straight along the rail 2a.

Although the invention has been shown and described with respect to preferred embodiments thereof, the invention is not limited to these specific embodiments. For example, the shaft 13 may be fixed to the plate 8 by screw fitting or welding. The cross-sectional shape of the rail 2 may be any appropriate alternative defining a totally channel-shaped cross section including opposite side walls which provide guide planes.

According to the invention, in general, since the construction of the rail is simple and easy to process and assemble, a product capable of carrying a light structure can be made at low cost. The apparatus operates as an excellent linear guide apparatus with a high linearity and ensuring intimate fitness between the rail and the slider.

In the construction where the rollers are made of a sintered metal impregnated with lubricant, good lubrication is always maintained between the guide surfaces of the rail and the rollers, which further increases the smoothness in movement of the slider and minimizes unordinary abrasion at the contacts.

In the construction where the rollers are made of an elastic material such as plastic resin or rubber, the rollers can absorb any dimensional difference of the entire width of the rollers from the distance between the guide surfaces of the rail, which contributes to maintaining good contact of the rollers with the guide surfaces of the rail and increasing the linearity accuracy of guidance by removal of the looseness.

In the construction where two roller-type linear guide apparatuses are used to form a parallel guide apparatus, on of which permit the rollers to move relative to the bearing in the axial direction, even if a slight deflection exists in mounting positions of these two roller-type linear guide apparatuses, the parallel guide apparatus can smoothly guide a structure. Therefore, two roller-type linear guide apparatuses can be mounted with a slight roughness in their relative parallel relation, while one of the roller type linear guide apparatus, with the rollers prohibited to move in the axial direction, behaves to guide the structure along a straight path.

What is claimed is:

1. A roller-type linear guide apparatus, comprising: a rail and a slider; said rail being of a plate material with a channel-shaped cross section and having opposite lateral walls whose inner surfaces define guide planes, said opposite lateral walls being curled inwardly at ends thereof; said slider having a plate for mounting a structure, and at least three rollers; each said roller having an outer diameter smaller than the distance between said guide planes of said rail, and being disposed on a bearing at an axis extending substantially normal to the plane of said plate and fixed to project from one surface of said plate, each roller being rotatable on said bearing; said slider being movable in said rail such that said rollers on said plate are contacted and supported by said guide planes of said rail; said rollers attached to said plate have a width slightly larger than the distance between said guide planes of said rail, and being disposed to alternately contact said guide planes of said rail in a lengthwise direction of said rail, said rollers are made of a sintered metal impregnated with a lubricant, and said opposite lateral walls of said rail being outwardly deformable by said rollers, thereby to compensate for dimensional variations in the width of said rail.

* * * * *